(12) United States Patent
Buiel

(10) Patent No.: US 8,347,468 B2
(45) Date of Patent: Jan. 8, 2013

(54) METHOD OF MAKING A CURRENT COLLECTOR

(75) Inventor: Edward R. Buiel, Poland, OH (US)

(73) Assignee: Axion Power International Inc., New Castle, PA (US)

( * ) Notice: Subject to any disclaimer, the term of this patent is extended or adjusted under 35 U.S.C. 154(b) by 439 days.

(21) Appl. No.: 12/636,058

(22) Filed: Dec. 11, 2009

(65) Prior Publication Data

US 2010/0319172 A1    Dec. 23, 2010

Related U.S. Application Data

(60) Provisional application No. 61/121,956, filed on Dec. 12, 2008.

(51) Int. Cl.
*H01M 4/82* (2006.01)
*H01M 4/72* (2006.01)

(52) U.S. Cl. .................................. 29/2; 429/243

(58) Field of Classification Search . 29/2; 429/122–347
See application file for complete search history.

(56) References Cited

U.S. PATENT DOCUMENTS

| | | | |
|---|---|---|---|
| 397,796 A | 2/1889 | Gibson | |
| 704,739 A | 7/1902 | Entz | |
| D332,082 S | 12/1992 | Cordes et al. | |
| 5,264,306 A | 11/1993 | Walker, Jr. et al. | |
| 5,989,749 A | 11/1999 | Kao et al. | |
| 6,187,473 B1 * | 2/2001 | Tamezane et al. | 429/164 |
| 6,316,148 B1 | 11/2001 | Timmons et al. | |
| 6,466,429 B1 | 10/2002 | Volfkovich | |
| 6,628,504 B2 | 9/2003 | Volfkovich et al. | |
| 6,706,079 B1 | 3/2004 | Shmatko et al. | |
| 7,006,346 B2 | 2/2006 | Volfkovich et al. | |
| 7,060,391 B2 | 6/2006 | Gyenge et al. | |
| 7,105,252 B2 | 9/2006 | Kelley et al. | |
| 7,110,242 B2 | 9/2006 | Adrianov et al. | |
| 2003/0143466 A1 * | 7/2003 | Goda et al. | 429/241 |
| 2006/0263692 A1 | 11/2006 | Kelley et al. | |
| 2008/0131763 A1 | 6/2008 | Buiel et al. | |
| 2009/0103242 A1 | 4/2009 | Buiel et al. | |

FOREIGN PATENT DOCUMENTS

| | | |
|---|---|---|
| JP | 06342660 A | 12/1994 |
| JP | 11329420 A | 11/1999 |

OTHER PUBLICATIONS

Abstract of JP 11329420 (Nov. 30, 1999).
Abstract of JP 06342660 (Dec. 13, 1994).
Abstract of KR1020060042860 (May 15, 2006).

* cited by examiner

*Primary Examiner* — Basia Ridley
*Assistant Examiner* — Jonathan G Leong
(74) *Attorney, Agent, or Firm* — Cahn & Samuels, LLP

(57) ABSTRACT

A method of manufacturing a current collector comprising embossing a sheet comprising lead thereby forming an embossed grid comprising rows of raised portions and lowered portions, and slots comprising edges of the raised portions and lowered portions; creating areas for tab creation by pressing or stamping areas of the embossed grid to a flattened state, thereby forming a sheet comprising embossed grid sections and flat sections; applying paste to the top and bottom of the embossed grid sections; and stamping current collectors out of the sheet such that at least one tab is created from a flat section.

5 Claims, 5 Drawing Sheets

METHOD OF MAKING A CURRENT COLLECTOR

This U.S. nonprovisional application claims priority of U.S. provisional patent application Ser. No. 61/121,956 filed in the U.S. Patent and Trademark Office on Dec. 12, 2008, the entirety of which is incorporated herein by reference.

I. FIELD OF THE INVENTION

This invention relates to methods for making a current collector for an electrode of an energy storage device.

II. BACKGROUND OF THE INVENTION

Energy storage devices may comprise at least one lead positive electrode and at least one carbon negative electrode. At least one electrode (positive, negative, or both) may comprise a current collector grid having undulating surfaces. This application incorporates both U.S. Ser. No. 12/241,736 filed on Sep. 30, 2008 and U.S. Ser. No. 11/875,119 filed on Oct. 19, 2007 in the U.S. Patent and Trademark Office by reference in their entireties herein.

In making electrodes, it is conventional to stamp a current collector from a sheet or roll of foil. However, the size of the current collector may vary from energy storage device to energy storage device, in terms of at least one of height, width, or thickness of the sheet or foil to be used. Accordingly, conventional processes require specific tooling for each current collector design, depending on the nature of the energy storage device. In addition, conventional stamping of a current collector element from a sheet or roll of foil creates waste.

There remains a need to make electrodes comprising current collectors that eliminates waste and the need for separate stamping tools for each current collector design.

III. SUMMARY OF THE INVENTION

It is an object of the present invention to provide an current collector for an electrode of an energy storage device.

It is an advantage of the present invention that the making of a current collector minimizes or eliminates waste.

It is another advantage of the present invention to minimize or eliminate the need for preparing costly tooling for different current collector designs.

The above objects and advantages are satisfied by a method of manufacturing a current collector that includes embossing a sheet comprising lead thereby forming an embossed grid comprising rows of raised portions and lowered portions, and slots comprising edges of the raised portions and lowered portions; creating areas for tab creation by pressing or stamping areas of the embossed grid to a flattened state, thereby forming a sheet comprising embossed grid sections and flat sections; applying paste to the top and bottom of the embossed grid sections; and stamping current collectors out of the sheet such that the tabs are created from the flat sections.

As used herein "substantially", "generally", "relatively", "approximately", and "about" are relative modifiers intended to indicate permissible variation from the characteristic so modified. It is not intended to be limited to the absolute value or characteristic which it modifies but rather approaching or approximating such a physical or functional characteristic.

References to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

In the following description, reference is made to the accompanying drawings, which are shown by way of illustration to specific embodiments in which the invention may be practiced. The following illustrated embodiments are described in sufficient detail to enable those skilled in the art to practice the invention. It is to be understood that other embodiments may be utilized and that structural changes based on presently known structural and/or functional equivalents may be made without departing from the scope of the invention.

IV. BRIEF DESCRIPTION OF THE DRAWINGS

Figure 9:
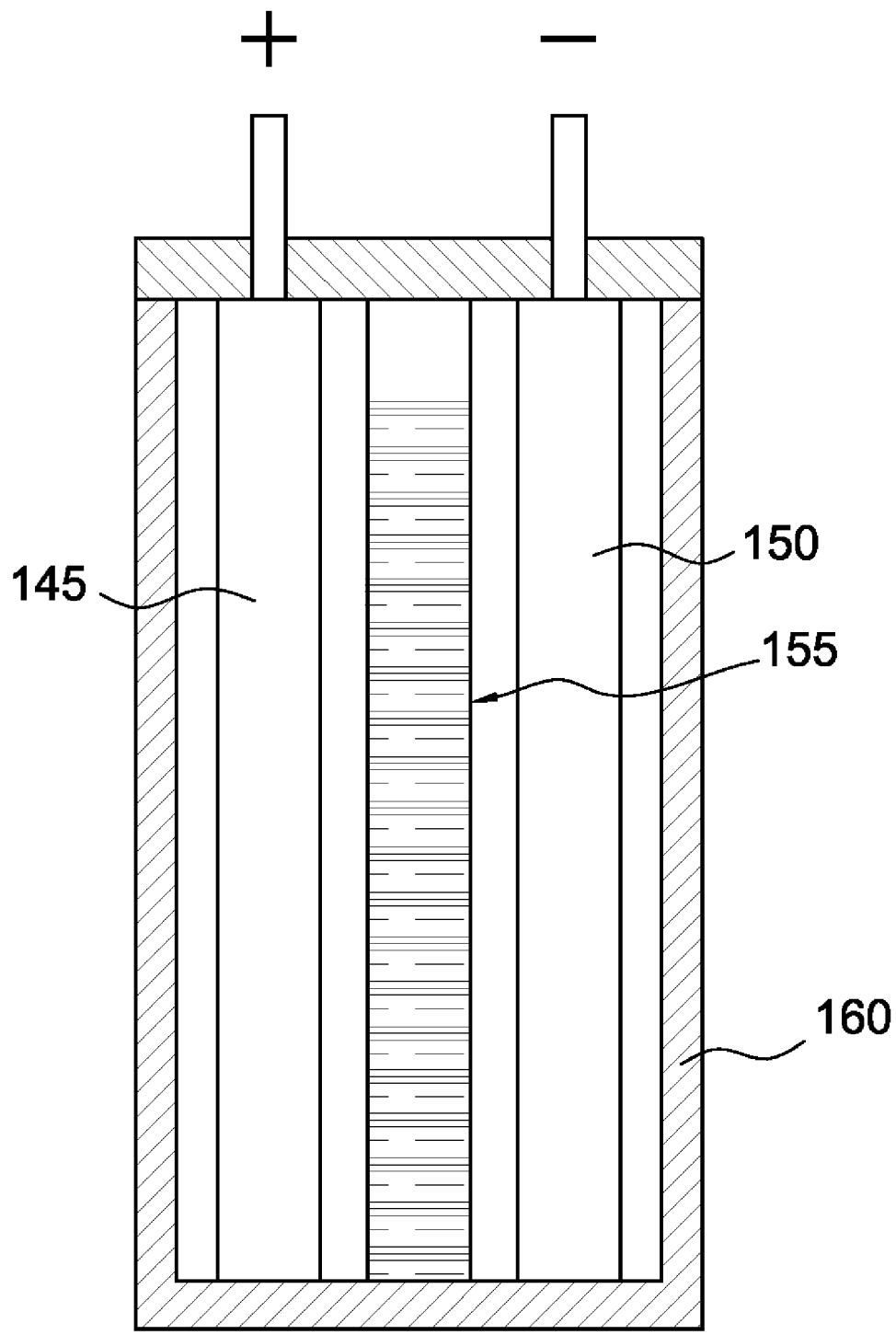

FIG. 9 schematically illustrates an energy storage device according to a specific embodiment of the present invention.

V. DETAILED DESCRIPTION OF INVENTION

According to the present invention, a current collector having a reduced resistance grid may be utilized with at least one of a positive electrode or a negative electrode. In specific embodiments, the current collector grid is used with a positive electrode. An energy storage device according to the present invention comprises at least one electrode having a reduced resistance grid. The energy storage device comprises a separator between at least one positive electrode and at least one negative electrode. The energy storage device also comprises an electrolyte and a casing.

FIGS. 1-9 illustrate a current collector for an electrode and a method of making the current collector.

Figure 1:
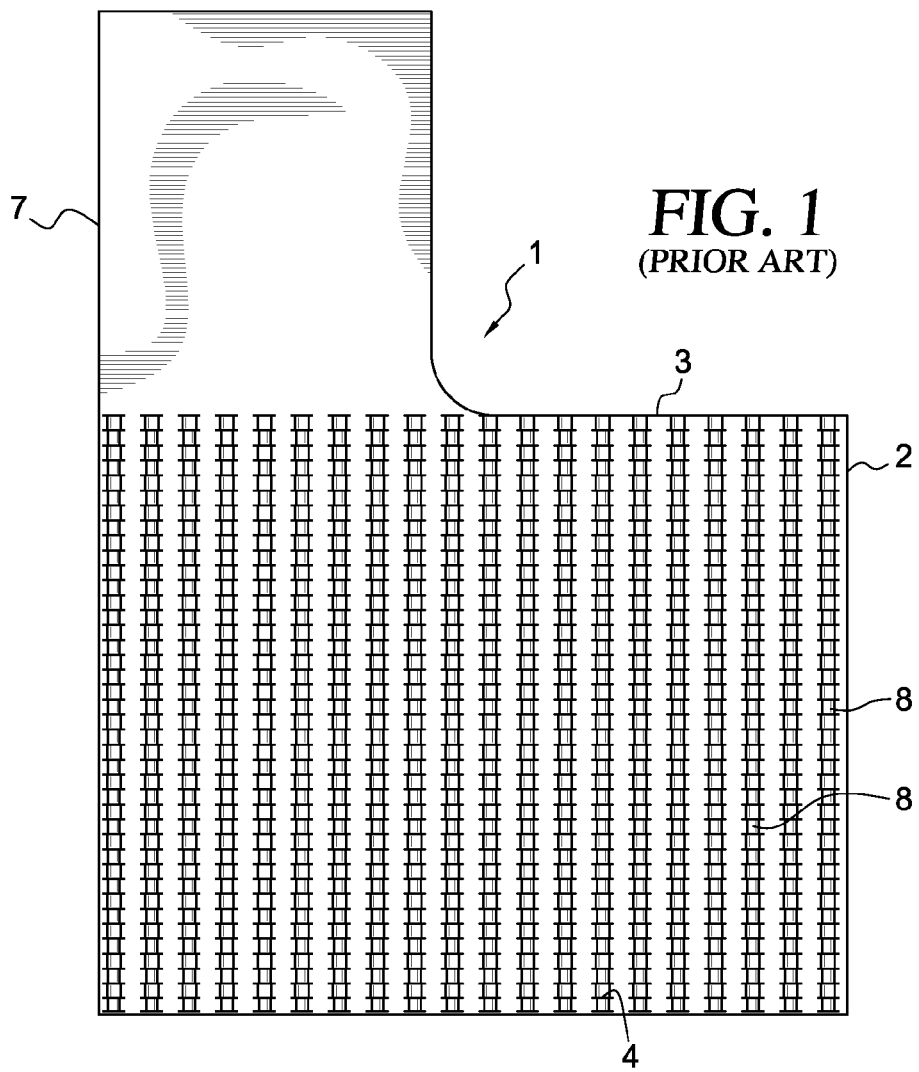
FIG. 1 illustrates a prior art current collector grid plate.
Figure 2:
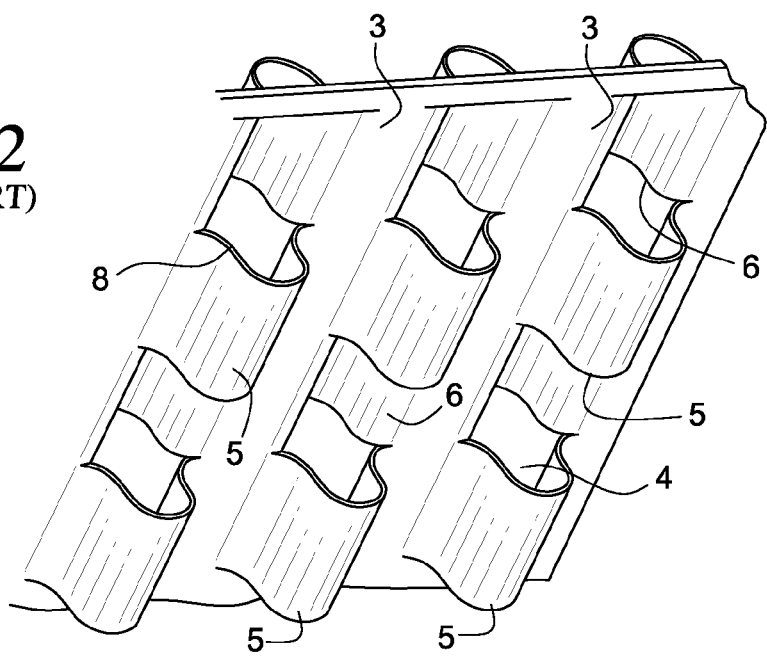
FIG. 2 is an elevation magnified sectional view of FIG. 1.

Generally, a current collector plate 1 is characterized by a grid section 2 disposed below a tab 7 projecting from an edge of the plate. The plate incorporates a grid defined by a plurality of continuous, planar, spaced, parallel current channels 3 disposed between interleaved rows 4 of raised segments 5 and lowered segments 6, as illustrated in FIG. 2.

The rows 4 result in the creation of slots 8. The slots permit both electrical and fluid communication between regions where active material or paste is placed behind raised portions 5 and behind lowered segments 6. The slots define the edges of the channels established by the raised and lowered segments 5, 6 which are filled with conductive paste (e.g., lead oxides) to provide a current path from the lower portion of the plate to the upper portion and tab 7.

According to the present invention, the slots may be made as a result of punching, machining, or casting a planar sheet of conductive material, particularly metals, or molding the sheet. In certain embodiments, the slots may result from cutting the sheet or by deforming the planar sheet without cutting.

According to the present invention, a positive electrode of an energy storage device may comprise a current collector comprising lead or lead alloy; a lead dioxide paste adhered to and in electrical contact with the surfaces thereof; and a tab element extending from a side, for example from a top edge, of the positive electrode.

In certain embodiments, a negative electrode may comprise a conductive current collector; a corrosion-resistant coating; an activated carbon material; and a tab element extending from a side, for example from above a top edge, of the negative electrode.

Typically, the current collector of the negative electrode comprises a material having better conductivity than lead and may comprise copper, iron, titanium, silver, gold, aluminum, platinum, palladium, tin, zinc, cobalt, nickel, magnesium, molybdenum, stainless steel, mixtures thereof, alloys thereof, or combinations thereof.

A corrosion-resistant conductive coating may be applied to the current collector. The corrosion-resistant conductive coating is chemically resistant and electrochemically stable in the in the presence of an electrolyte, for example, an acid electrolyte such as sulfuric acid or any other electrolyte containing sulfur. Thus, ionic flow to or from the current collector is precluded, while electronic conductivity is permitted. The corrosion-resistant coating preferably comprises an impregnated graphite material. The graphite is impregnated with a substance to make the graphite sheet or foil acid-resistant. The substance may be a non-polymeric substance such as paraffin or furfural. Preferably, the graphite is impregnated with paraffin and rosin.

The active material of the negative electrode comprises activated carbon. Activated carbon refers to any predominantly carbon-based material that exhibits a surface area greater than about 100 $m^2/g$, for example, about 100 $m^2/g$ to about 2500 $m^2/g$, as measured using conventional single-point BET techniques (for example, using equipment by Micromeritics FlowSorb III 2305/2310). In certain embodiments, the active material may comprise activated carbon, lead, and conductive carbon. For example, the active material may comprise 5-95 wt. % activated carbon; 95-5 wt. % lead; and 5-20 wt. % conductive carbon.

Figure 3:
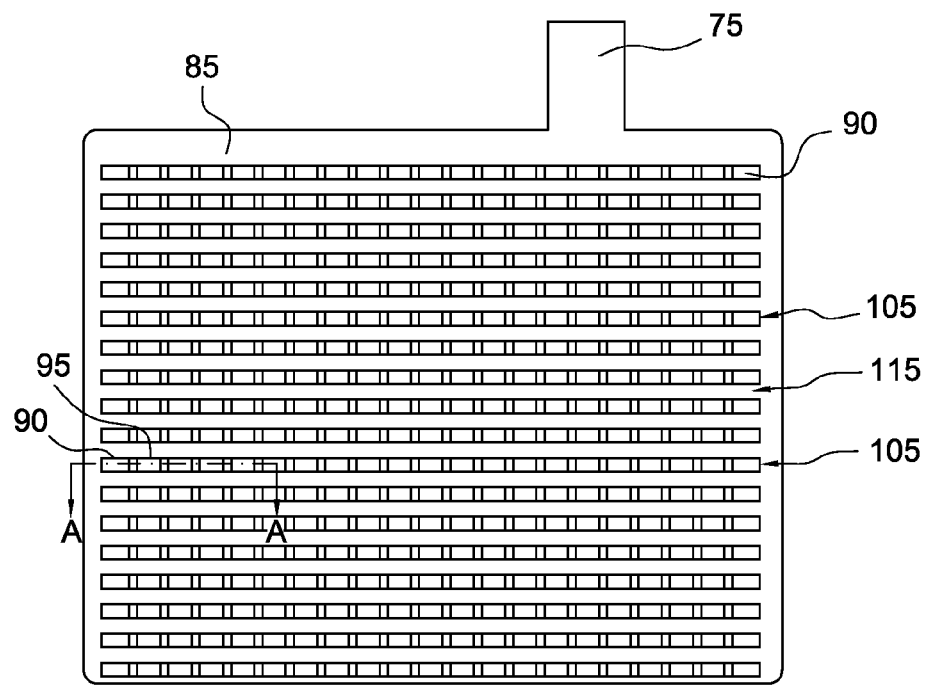
FIG. 3 is a view of a current collector utilized in a positive electrode according to the present invention.

As illustrated in FIG. 3, a lead current collector 85 for a positive electrode is shown. Typically, the material of the current collector 85 is sheet lead. Each current collector 85 has a plurality of raised portions 90, and another plurality of lowered portions 95, where the terms "raised" and "lowered" are taken with reference to a mean plane 100 for the current collector 85. The matrix of raised and lowered portions is such that they are arranged in rows 105. Intervening and undisturbed or planar portions are arranged in rows 115. The current collector comprises tab 75.

Figure 4:
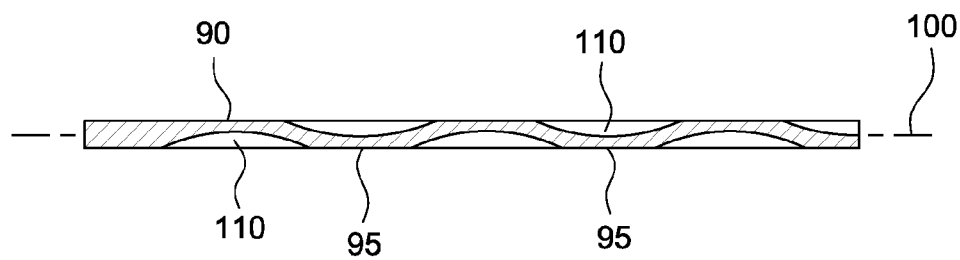
FIG. 4 is a cross-section in the direction of arrows A-A in FIG. 3.

As illustrated in FIG. 4, it will be seen that in cross-section the current collector 85 has an undulating appearance along each of the rows 105. On the reverse side of each of the lowered portions 95 there appears a significant bowl-like region into which active material 110 is placed. Likewise, on the reverse side of each of the raised portions 90, there also appears a significant bowl-like region into which active material 110 is placed.

It will be understood that slots will be formed in the regions between the raised and lowered portions in rows 105. The slots permit both electrical and fluid communication between regions where the active paste 110 is placed behind raised portions 90 and the regions where the active paste 110 is placed behind lowered portions 95. This also assists in reducing the likelihood of spalling or flaking of the active material during charge and discharge cycles.

Figure 5:
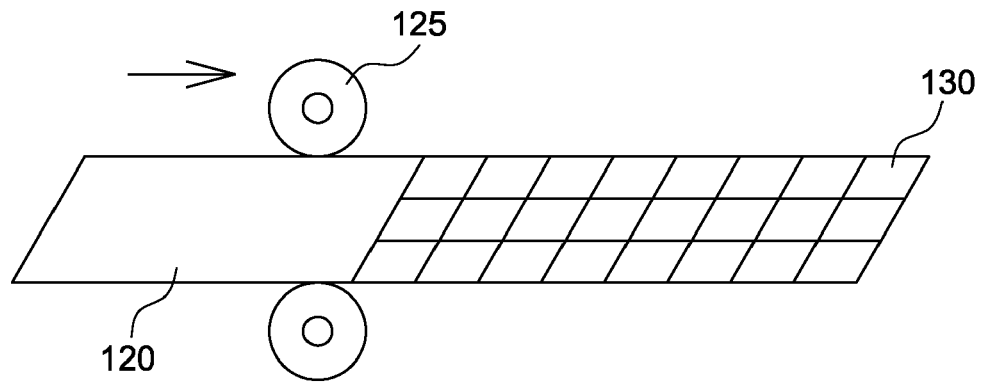
FIG. 5 illustrates a method for embossing a sheet to create an embossed grid.

As illustrated in FIG. 5, in embodiments, a method of manufacturing a current collector according to the present invention comprises embossing a sheet or roll 120, for example of lead foil, via at least one embossing roller or device 125 to create an embossed grid 130 comprising a matrix of raised and lowered portions arranged in rows and having slots.

Figure 6:
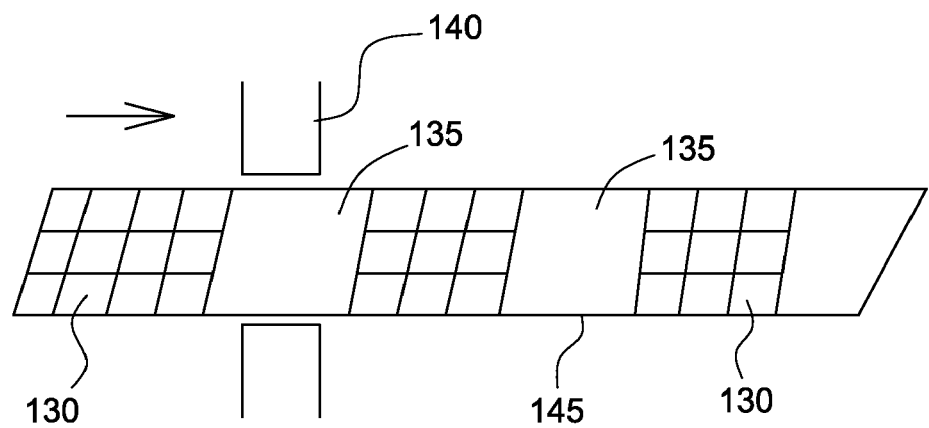
FIG. 6 illustrates a method for stamping the embossed sheet of FIG. 5 to create areas for tab sections.
Figure 7:
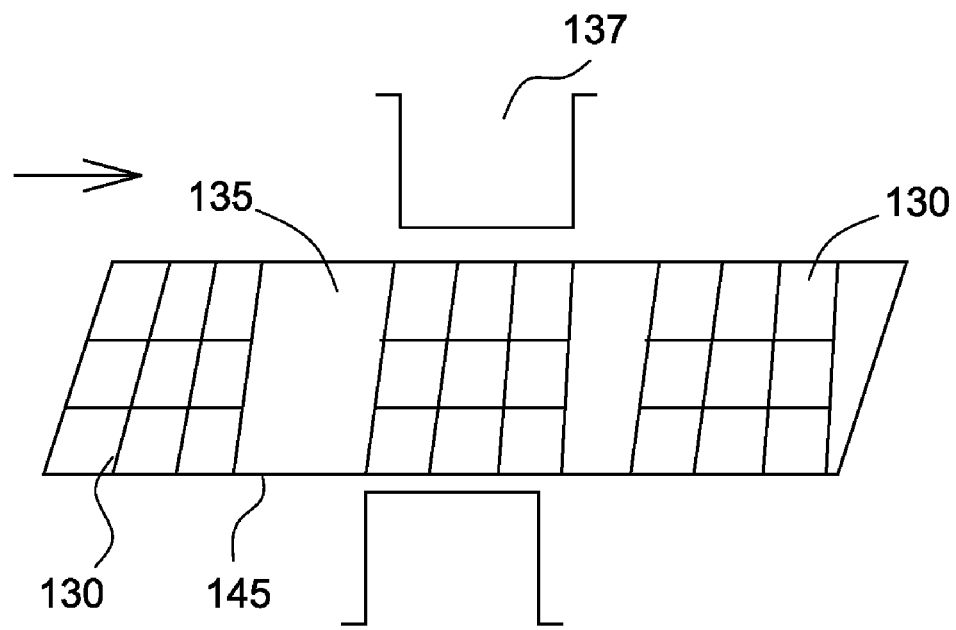
FIG. 7 illustrates applying paste to the embossed areas of the sheet.

As illustrated in FIG. 6, areas 135 for later tabs for current collectors are created by pressing or stamping said areas 135 of the embossed grid 130 back to a flattened state, for example, via at least one press or stamping device 140 to form a strip 145 with embossed grid sections 130 and flattened areas 135. In embodiments, paste (e.g., a lead oxide) is applied to the top and bottom of the embossed grid sections 130, via at least one paste disperser or device 137, as illustrated in FIG. 7.

Figure 8:
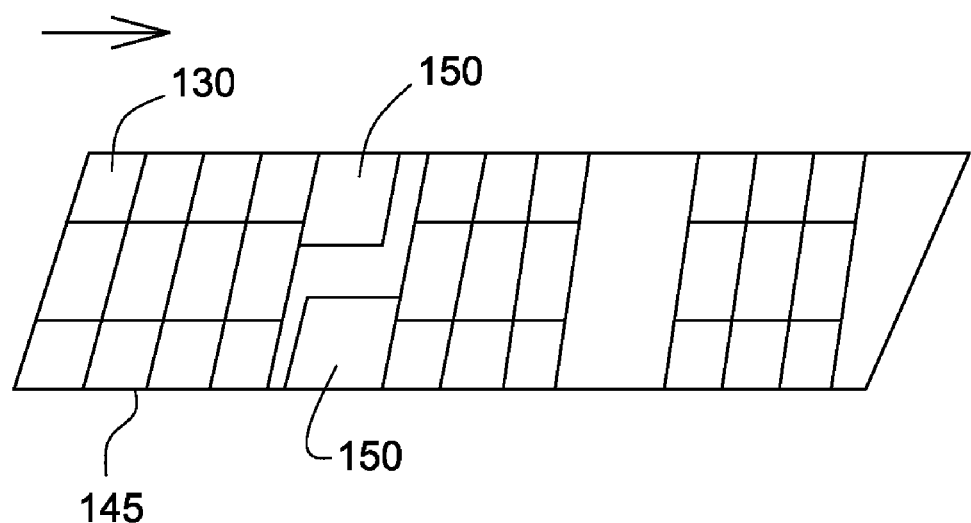
FIG. 8 illustrates punching current collectors from the sheet.

As illustrated in FIG. 8, current collectors are formed with tabs 150 that are stamped out of the flattened areas 135 from the pasted strip 145. The tabs 150 are aligned with the machine direction.

Alternatively, the at least one embossing roller or device 125 may be intermittently jogged in order to create areas 135 for the later tab sections without the need for a separate press or stamping device 140.

As illustrated in FIG. 9, an energy storage device comprises at least one positive electrode 145, at least one negative electrode 150, a separator 155, and a casing 160.

In embodiments, the paste may be applied to the top and bottom of the entire strip (both embossed sections and sections for tab creation). Current collectors with tab sections may be stamped out of the strip and the paste may be later removed from the tab sections.

Although specific embodiments of the invention have been described herein, it is understood by those skilled in the art that many other modifications and embodiments of the invention will come to mind to which the invention pertains, having benefit of the teaching presented in the foregoing description and associated drawings.

It is therefore understood that the invention is not limited to the specific embodiments disclosed herein, and that many modifications and other embodiments of the invention are intended to be included within the scope of the invention. Moreover, although specific terms are employed herein, they are used only in generic and descriptive sense, and not for the purposes of limiting the description invention.

What is claimed is:

1. A method of manufacturing a current collector, comprising the following steps:
    a) embossing a sheet comprising lead, thereby forming an embossed grid comprising rows of raised portions and lowered portions, and slots comprising edges of the raised portions and lowered portions;
    b) after said embossing, pressing or stamping areas of the embossed grid to a flattened state, thereby forming a plurality of flat sections; and
    c) applying paste to the top and bottom of the entire sheet comprising a plurality of flat sections and a plurality of embossed grid sections;
    d) stamping current collectors out of the sheet such that at least one tab is created from each flat section between embossed grid sections; and
    e) removing paste from the at least one tab.

2. A method of making an energy storage device comprising using the current collector from claim 1 in an energy storage device.

3. A method of making an energy storage device, comprising:
   making at least one positive electrode comprising a current collector according to claim 1;
   inserting the at least one positive electrode and at least one negative electrode into a casing;
   adding a separator between the at least one positive electrode and at least one negative electrode; and
   adding an electrolyte.

4. A method according to claim 1, wherein said stamping of current collectors creates at least one tab that extends in a direction between embossed grids sections.

5. A method according to claim 1, wherein said stamping of current collectors creates at least one tab that extends in a direction in which the sheet is embossed in step a).

* * * * *